(12) United States Patent
Drabek et al.

(10) Patent No.: US 8,272,287 B2
(45) Date of Patent: Sep. 25, 2012

(54) DEVICE FOR LATCHING AND LOCKING SHIFT ROCKERS OF A SHIFT DEVICE OF A TRANSMISSION, AND USE OF A DEVICE OF SAID TYPE

(75) Inventors: Michael Drabek, Brandenburg (DE); Matthias Retsch, Brandenburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 315 days.

(21) Appl. No.: 12/674,099

(22) PCT Filed: Sep. 11, 2008

(86) PCT No.: PCT/EP2008/062026
§ 371 (c)(1),
(2), (4) Date: Feb. 18, 2010

(87) PCT Pub. No.: WO2009/037175
PCT Pub. Date: Mar. 26, 2009

(65) Prior Publication Data
US 2011/0048155 A1    Mar. 3, 2011

(30) Foreign Application Priority Data

Sep. 18, 2007  (DE) .......................... 10 2007 044 519

(51) Int. Cl.
*B60K 20/02*    (2006.01)
(52) U.S. Cl. .................... 74/330; 74/473.27; 74/473.28; 74/473.25
(58) Field of Classification Search .................... 74/330, 74/473.36, 473.21, 473.23–473.28
See application file for complete search history.

(56) References Cited

U.S. PATENT DOCUMENTS

| | | | |
|---|---|---|---|
| 2,220,543 A * | 11/1940 | Peterson | 74/333 |
| 3,264,894 A | 8/1966 | Popovich et al. | |
| 3,444,752 A | 5/1969 | Fisher et al. | |
| 5,186,070 A * | 2/1993 | Nitzschke et al. | 74/473.24 |
| 5,802,916 A * | 9/1998 | Ebinger et al. | 74/360 |
| 6,026,702 A * | 2/2000 | Dreier et al. | 74/473.21 |
| 6,691,590 B1 * | 2/2004 | Patzner et al. | 74/473.24 |
| 7,089,821 B2 | 8/2006 | Schaefer et al. | |

FOREIGN PATENT DOCUMENTS

| | | |
|---|---|---|
| DE | 77 14 034 U1 | 1/1979 |
| DE | 40 17 957 A1 | 12/1990 |
| DE | 41 18 931 A1 | 12/1992 |
| DE | 199 01 056 A1 | 8/1999 |
| DE | 198 43 584 A1 | 3/2000 |
| DE | 199 51 683 A1 | 5/2001 |
| DE | 101 53 634 A1 | 5/2003 |
| DE | 103 51 131 A1 | 6/2005 |
| DT | 1 780 027 | 12/1971 |
| DT | 1 750 032 | 1/1972 |
| GB | 1 268 847 | 3/1972 |
| WO | 2006/004422 A1 | 1/2006 |

* cited by examiner

Primary Examiner — William C Joyce
Assistant Examiner — Terence Boes
(74) Attorney, Agent, or Firm — Davis & Bujold, P.L.L.C.

(57) ABSTRACT

A device for latching and locking of shift rockers (1, 1') of a shift device of a transmission. The device has a lock part (3, 3'), for each shift rocker (1, 1'), which resides in a receptacle (2) of the shift rocker (1, 1'), which interacts with a lock contour (5, 5'), positioned in a non-moving area of the transmission, for the latching purpose, whereby the lock part (3, 3') also serves, in addition to the latching, as an interlock for the shift rocker (1, 1').

12 Claims, 2 Drawing Sheets

DEVICE FOR LATCHING AND LOCKING SHIFT ROCKERS OF A SHIFT DEVICE OF A TRANSMISSION, AND USE OF A DEVICE OF SAID TYPE

This application is a National Stage completion of PCT/EP2008/062026 filed Sep. 11, 2008, which claims priority from German patent application serial no. 10 2007 044 519.0 filed Sep. 18, 2007.

FIELD OF THE INVENTION

The present invention relates to a device for latching and locking of shift rockers of a shifting device of a transmission.

BACKGROUND OF THE INVENTION

Shifting devices are known for transmissions for motor vehicles in the automotive technology. They usually comprise of a central shifting shaft, at which several shift rockers are positioned which, when shifting gears, engage with associated sliding sleeves.

In transmissions where the gear is engaged through shifting parts, a locking of the shifting parts, which is not participating in the shifting operation, has to be ensured whereby the locking usually takes place through separate parts, for instance pins. As an example, in traditional manual shift transmissions more than two shifting parts need to be locked; in a double clutch transmission, however, one shifting part for each partial transmission needs to be locked. The latching usually takes place by means of a latching bolt which is supported in the enclosure or otherwise, whereby the latching contour is positioned at the shifting part.

In addition, latching devices are known in the art which are positioned directly on the synchronizer body. Hereby, springs are inserted into at least two boreholes, positioned on the circumference of the synchronizer body, which are in an operating connection with balls and an associated contour in the gear shift sleeve.

Passive interlocking devices are common where the shifting parts lock themselves, and active interlocking devices, in which the required shifting part, which is needed for the shifting procedure, is released through shifting parts. Known in the art are devices, mainly relate to a shifting part, which releases the associated shifting parts through special contours.

Known to the applicant, by DE-A-199 51 683, is a locking device for a motor vehicle manual shift transmission which is designed in such way that the device already locks the non-required shifting parts when selecting a shift path, meaning before the required gear gets engaged in the chosen shift path. This manual transmission has a central shift shaft with fork shaped shifting parts, in the form of shift rockers or selector forks, which engage in a shift sleeve as well as a locking device which has a lever, whose pivoting point is positioned on a rotation axis of the axial, sliding mounted, central shifting shaft, and which is linked with it through a radial drive configuration. In addition, a lock part is provided which is fixedly mounted to the enclosure, in the direction of shifting, and which has a drive mechanism which converts rotation of the lever into linear movement of the locking device, transverse to the shifting direction of the central shifting shaft. Also, lock parts on the shifting parts and on the lock part are provided in such a way that a shifting movement of the shifting parts, in the direction of shifting, is prevented if these lock parts are covered. The lock part is a particular locking plate which is slidingly positioned on several guide bolts and transverse to the shifting shaft, and it has numerous cut-outs which interact with the lock parts positioned on the shifting parts.

A manual shift transmission is known to the applicant by the DE 41 18 931 A1, comprising several synchronizing units which are activated through shift rockers or through gear forks, which are positioned on shifting rods. Hereby, lock parts, comprising lock rockers to lock several shift rockers among each other, are provided as well as lock balls or a lock plate to lock several shifting rods among each other.

SUMMARY OF THE INVENTION

The task of this invention is to present a device for latching and locking of shift rockers of a shifting device of a transmission without the need for a separate part for such locking.

Thus, a device is proposed for latching and locking of the shift rockers of a shifting device of a transmission which has a lock part, positioned in a receptacle of the shift rocker for each shift rocker, which interacts with a lock contour, positioned in a non-moving area of the transmission, whereby the lock part, in addition to latching, also serves for the locking of the shift rocker.

In accordance with the invention, the lock part can comprise of a combined part with a self contained enclosure (combined bolt) or of a sleeve, a spring and a bolt, or a ball.

In a favorable way, the lock part also serves for locking of the shift rockers, not needed for shifting, whereby a pivoting interlock plate is provided for this purpose, in the non-moving area of the transmission, which has slots to accommodate the two shift rockers, adjacent the respective enclosure or the sleeve of the lock parts.

Hereby, due to the movement of the shift rocker, when engaging a gear and thus by movement of the lock part, the interlock plate is rotated by the enclosure or sleeve of the lock bolt, respectively, in such a way that the respective enclosure or sleeve of the lock part, of the adjacent shift rocker remains inserted in the associated slot, free of play, as long as the lock part of the activated shift rocker is not moved back into the neutral position.

In this invention, the concept of the integration of the lock part into a shift rocker and its additional use to lock the shift rocker when it is not needed, and the need of a separate part for the mutual locking of two shift rockers, in the shifting direction, can be omitted.

The inventive device for the latching and the locking of shift rockers is particularly suitable for double clutch transmissions in which two shift rockers are provided in each partial transmission. It is also possible to use the inventive device in a conventional manual shift transmission.

BRIEF DESCRIPTION OF THE DRAWINGS

The invention is exemplarily explained further below, based on the supplied drawings.

DETAILED DESCRIPTION OF THE PREFERED EMBODIMENTS

Figure 1:
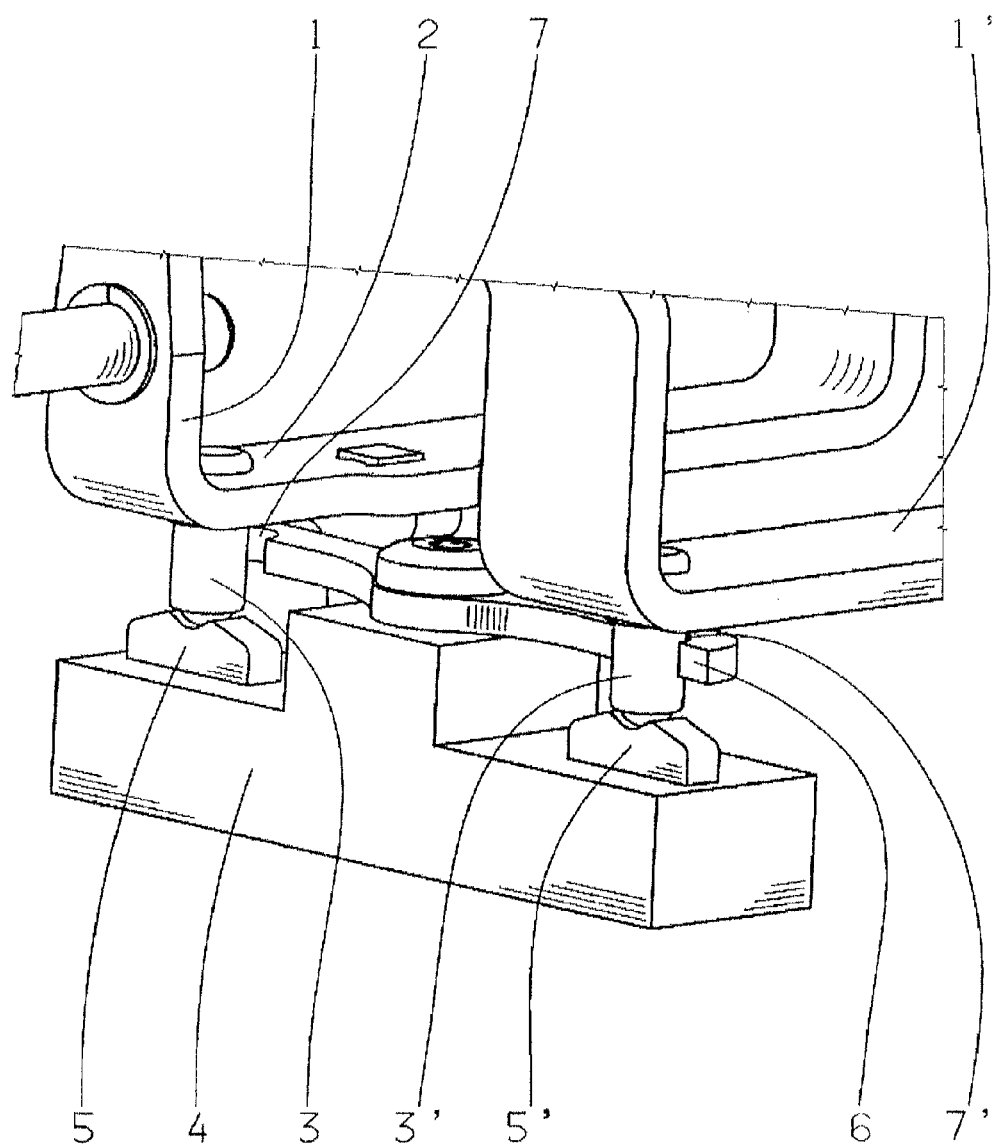
FIG. 1 shows a schematic perspective view of the inventive embodiment of the shift rocker, the lock contour, and the interlock metal plate, and FIG. 2 diagrammatically shows various embodiments of the shift rocker, the lock contour and the interlock metal plate.

In FIG. 1, two shift rockers 1, 1' are shown which each have a lock part 3, 3' in an associated receptacle 2. A lock contour 5, 5', corresponding with each of the lock part 3, 3', is positioned in a fixed area of the transmission, for instance in the enclosure 4. As diagrammatically shown in FIG. 2, the lock parts 3, 3' can also be designed as combined parts or comprise of a sleeve, a lock spring and a bolt or a ball.

Figure 2:
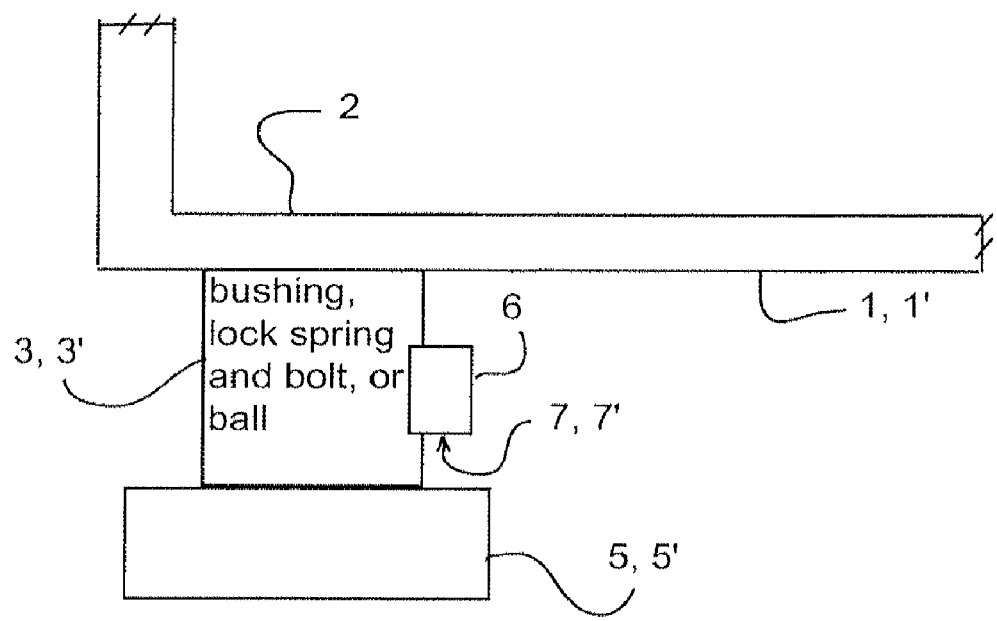

As shown in FIGS. 1 and 2, a provided interlock plate 6 is assigned to the shift rockers 1, 1', whose pivotal point is positioned between the two lock contours 5, 5' of the adjacent shift rockers 1, 1' whereby the interlock plate 6 has a slot 7, 7', at each end, for accommodating the enclosure or the bushing of the lock parts 3, 3', respectively.

When the shift rockers 1, 1' are in a neutral position, a neutral locking takes place through the operational connection between the lock parts 3, 3' and the related lock contours 5, 5'. Hereby, the lock parts 3, 3', through the force of a lock spring, are pressed into the related lock contours 5, 5' so that, without any application of force, no gear can be selected. Hereby, the interlock plate 6 is positioned and dimensioned in such a way that the enclosure or bushings, respectively, of the lock parts 3, 3' are partially positioned in a related slot 7, 7' of the interlock plate 6; in addition, the interlock plate 6 is maintained in this position via a spring part, not shown here.

If the shift rocker 1 is actuated at that time, the lock part 3, connected with the shift rocker, is forced out of the lock contour and performs an axial movement, due to the movement of the shift rocker and due to the geometry of the lock contour, against the force of the lock spring.

The interlock plate 6 of this invention is formed in such a way that the axial movement of the lock part 3 results in a rotation movement of the interlock plate 6, against the force of the spring element of the interlock plate 6, so that the slot 7' of the interlock plate 6 moves towards the lock part 3' of the non-actuated shift rocker 1' and fully accommodates it, whereby the enclosure or the bushing, respectively, of the lock part 3' of the adjacent shift rocker 1' remains inserted in the related slot 7', free of play, as long as the lock part 3 is not moved back into the neutral position, whereby the shift rocker 1' becomes interlocked.

Naturally, every constructive embodiment, especially the spatial positioning of the parts of the inventive device, for locking and interlocking of the shift rockers of a shifting device in a transmission, are considered, by each other and if technically logical, as a part of the presented claims, without affecting the function of the device as it is presented in the claims, even if the embodiments are not explicitly presented in the drawings or in the description.

The invention claimed is:

1. A device for latching and locking of shift rockers (1, 1') of a shifting device for a transmission, which has a lock part (3, 3'), for each shift rocker (1, 1'), in which, in addition to the latching, also serves for the locking of the shift rocker (1, 1'),
    wherein that the lock part (3, 3') is supported by a receptacle (2) of the shift rocker (1, 1'),
    the lock part (3, 3') interacts with a mating lock contour (5, 5'), which is fixedly and non-rotatably attached to and positioned on a non-moving part of the transmission, for the latching purpose, and
    an associated interlock plate (6), which has a slot (7, 7') adjacent each opposed end thereof for accommodating an enclosure or a bushing, respectively, of the lock parts (3, 3') of the shift rockers, is rotatably positioned between two lock contours (5, 5') of two adjacent shift rockers (1, 1'), and the interlock plate (6) is positioned and dimensioned in such a way that in a neutral position of the shift rockers (1, 1'), the respective enclosures or bushings of the lock parts (3, 3') are partially positioned in the associated slot (7, 7') of the interlock plate (6).

2. The device for latching and locking of shift rockers in a shifting device of a transmission according to claim 1, wherein the interlock plate (6) is formed in such a way that the axial movement of the lock part (3) of an actuated shift rocker (1), when leaving the mating lock contour (5), results in a rotation movement of the interlock plate (6) such that the respective enclosure or bushing of the lock part (3') of the adjacent shift rocker (1') remains pressed into the associated slot (7'), play-free, as long as the lock part (3) of the actuated shift rocker (1) is not moved back to the neutral position, thereby causing locking of the shift rocker (1').

3. The device for latching and locking of shift rockers in a shifting device of a transmission according to claim 1, wherein the lock parts (3, 3') of the shift rockers (1, 1') are at least one of separate parts or comprise one of a bushing, a lock spring and a bolt, or a ball.

4. A device for latching and locking of shift rockers (1, 1') of a shifting device for a transmission, which has a lock part (3, 3'), for each shift rocker (1, 1'), which in addition to the latching also serves for the locking of the shift rocker (1, 1'),
    wherein that the lock part (3, 3') is supported by a receptacle (2) of the shift rocker (1, 1'),
    the lock part (3, 3') interacts with a lock contour (5, 5'), which is fixedly and non-rotatably attached to and positioned on a non-moving part of the transmission, for the latching purpose, and an associated interlock plate (6), which has a slot (7, 7') adjacent each opposed end thereof for accommodating an enclosure or a bushing, respectively, of the lock parts (3, 3') of the shift rockers, is rotatable positioned between the two lock contours (5, 5') of two adjacent shift rockers (1, 1'), and the interlock plate (6) is positioned and dimensioned in such a way that in a neutral position of the shift rockers (1, 1'), the respective enclosures or bushings of the lock parts (3, 3') are both only partially positioned in the associated slot (7, 7') of the interlock plate (6), and
    the device for latching and locking of shift rockers in a shifting device of a transmission is incorporated into a double-clutch transmission.

5. The device for latching and locking of shift rockers in a shifting device of a transmission according to claim 1, wherein each lock part (3, 3') interacts with a separate independent lock contour (5, 5'), the interlock plate (6) is spaced from, mounted separately from, and moves independently from each of the mating lock contours (5, 5'), and each of the lock contours (5, 5') is spaced from and separate and independent from each other.

6. The device for latching and locking of shift rockers in a shifting device of a transmission according to claim 1, wherein a stepped protrusion of a transmission enclosure (4) is positioned between and separates adjacent lock contours (5, 5') from one another.

7. The device for latching and locking of shift rockers in a shifting device of a transmission according to claim 6, wherein the interlock plate is mounted on the stepped protrusion of the transmission enclosure (4).

8. The device for latching and locking of shift rockers in a shifting device of a transmission according to claim 1, wherein the mating lock contours (5, 5') are spaced from one another so at to avoid directly abutting against one another.

9. The device for latching and locking of shift rockers in a shifting device of a transmission according to claim 1, wherein the interlock plate (6) comprises only a single plate which only has a single slot (7, 7') positioned adjacent each opposed end thereof, and each single slot (7, 7') only accommodates one of the lock parts (3, 3')

10. A device for latching and locking of shift rockers (1, 1') of a shifting device for a transmission, the device comprising:

first and second lock parts (3, 3') for each shifting respective first and second shift rockers (1, 1'), and each of the first and the second lock parts (3, 3'), serving for the locking of the respective first and second shift rockers (1, 1'), wherein the first and the second lock parts (3, 3') are positioned in a respective receptacle (2) of the respective first and second shift rockers (1, 1'), the first lock part (3) interacts with a mating first lock contour (5) which is fixedly and non-rotatably supported by a housing of the transmission for latching the first shift rocker (1, 1') while the second lock part (3') interacts with a mating second lock contour (5') which is fixedly and non-rotatably supported by the housing of the transmission for latching the second shift rocker (1, 1'), a single interlock plate (6) is rotatably positioned between the first and the second lock contours (5, 5'), the single interlock plate (6) has only a single first slot (7') adjacent a first end thereof and only a single second slot (7') located adjacent a second opposite end thereof and, in a neutral position of the first and second shift rockers (1, 1'), the first slot (7) only partially accommodates the first lock part (3) of the first shift rocker (1) while the second slot (7') only partially accommodates the second lock part (3') of the second shift rocker (1'), and axial movement of one of the first and the second lock parts (3 or 3'), away from the mating lock contour (5), induces a rotational movement of the interlock plate (6) so that a respective one of the first and the second slots (7 or 7') of the interlock plate (6) moves towards and fully accommodates the other of the first and the second lock parts (3' or 3) so that the accommodated one of the first and the second lock parts (3' or 3) becomes interlocked until the axial moved one of the first and the second lock parts (3 or 3') again returns back to the neutral position.

11. The device for latching and locking of shift rockers in a shifting device of a transmission according to claim 10, wherein the first and the second lock parts (3, 3') are at least one of separate parts or comprise one of a bushing, a lock spring and a bolt, or a ball.

12. The device for latching and locking of shift rockers in a shifting device of a transmission according to claim 10, wherein the transmission comprises a double-clutch transmission.

* * * * *